J. BROPSON.
NON-SKIDDING DEVICE.
APPLICATION FILED DEC. 14, 1912.
1,110,107.
Patented Sept. 8, 1914.
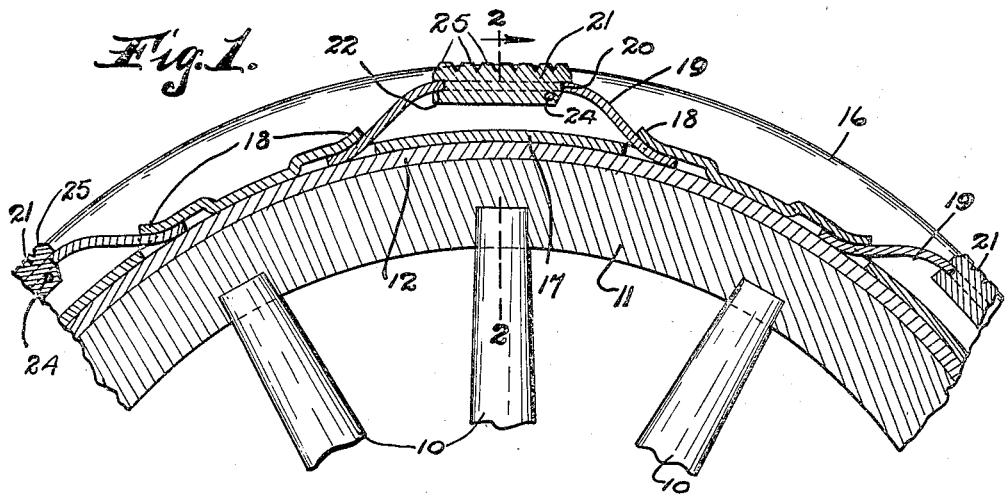
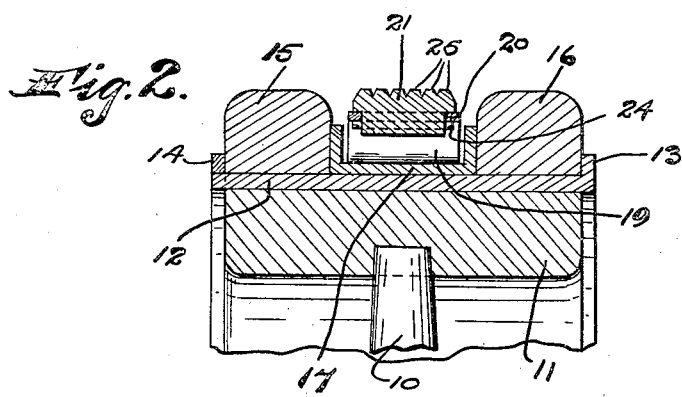
Witnesses:
H. J. Gettins.
N. L. McDonnell.
Inventor
James Bropson
by Lynch & Orr
his Attorneys.

UNITED STATES PATENT OFFICE.

JAMES BROPSON, OF CLEVELAND, OHIO.

NON-SKIDDING DEVICE.

1,110,107.

Specification of Letters Patent.

Patented Sept. 8, 1914.

Application filed December 14, 1912. Serial No. 736,700.

*To all whom it may concern:*

Be it known that I, JAMES BROPSON, a citizen of the United States of America, residing at Cleveland, in the county of Cuyahoga and State of Ohio, have invented certain new and useful Improvements in Non-Skidding Devices; and I hereby declare the following to be a full, clear, and exact description of the invention, such as will enable others skilled in the art to which it pertains to make and use the same.

This invention relates to new and useful improvements in non-skidding devices for tires.

One object of this invention is to provide a new and improved non-skidding device for attachment to the wheels of automobiles and other power-driven vehicles which will be durable, efficient in operation and which can be readily applied to or taken off of the wheel.

A further object of my invention is to provide a device of this character which will also add to the resiliency of the wheel, thereby relieving the tire of considerable strain and consequently adding to the life thereof.

With these objects in view and with the intention of securing other advantages which will hereinafter appear my device consists in the features of construction and combination of parts, hereinafter described in the specification, pointed out in the claims and illustrated in the accompanying drawings.

In the accompanying drawings I have shown my device applied to a wheel having a tire consisting of two resilient bands which are spaced apart on the rim of the wheel in the usual manner, and in said drawings Figure 1 is a vertical sectional view of a portion of a wheel provided with my invention. Fig. 2 is a section on line 2—2, Fig. 1.

Again referring to the drawings 10 represents the spokes of the wheel and 11 represents the felly which is of the usual character. Around the felly of the wheel is arranged a rim 12 having an annular integral flange 13 at one side and an annular detachable flange 14 at the opposite side. On the said rim are mounted a pair of resilient tires, shown at 15 and 16, which are spaced apart a predetermined distance in the usual manner. These tires may be made of hard rubber or composition, or may be in the form of inflated tubes. On the rim 12 between said tires is mounted a band 17, channel-shaped in cross-section, and this band is made sufficiently wide so that the side flanges thereof act to clamp the tires 15 and 16 against the respective flanges 14 and 13 of the rim 12, thereby holding said tires positively in position. At predetermined points around the band tongues 18 are formed. These tongues are preferably formed by cutting the material of the band and forcing it upwardly at an angle to the band so that the tongues are integral with the band and an opening is formed in the band where the said tongues are formed. These tongues 18 are arranged in pairs and the tongues of each pair are oppositely disposed so that they face or extend toward each other.

19 represents a bow-spring and there are as many of these springs as there are pairs of tongues 18 and each bow-spring 19 is made sufficiently long so as to span the distance between the tongues of each pair of tongues. The ends of the said springs are inserted under the said tongues 18 so that the said ends rest on the rim 12 and are clamped against it by the said tongues 18. At the center of each of the springs 19 is formed an oblong slot or opening 20. In each of these openings 20 is arranged a block 21 which has a reduced portion which fits down into said opening and the outer or projecting portion of the block overlaps the spring at the sides of the opening. In order to hold the blocks in place a shoulder 22 is formed on the portion of the block which extends through the opening 20 at one side thereof and said shoulder extends under the spring at one side of the said opening and at the opposite side of said block a pin 24 is passed through the block underneath the spring and projects at each side of the block so as to engage the spring at the edge of the opening. The block is therefore rigidly but detachably held in position on the spring and it is therefore possible to remove the block when the surface thereof becomes worn. The blocks 21 are preferably provided with roughened or corrugated surfaces, shown at 25. When the vehicle is under normal load the said blocks will be in contact with the surface over which the wheel is traveling, and as the tires yield the springs supporting the said blocks will also yield so that the said device will not in any way interfere with the cushioning effect of the tires, but at the same time the said blocks will always be pressed against the surface on which the wheel is traveling with sufficient tension to absolutely prevent the skidding of the wheel.

It will be seen that the blocks and the supporting springs can be readily disengaged so that when it is not necessary to use a non-skidding device on the wheel they can be removed and stored in a comparatively small space.

What I claim is,—

1. In combination, a wheel, a rim arranged on said wheel, a resilient tire mounted on said rim, a band arranged on said rim adjacent to said tire, said band being provided with a series of tongues arranged in pairs, the tongues of each pair of tongues extending toward each other, a series of bow-shaped springs disposed around said band and having their ends extending in under the tongues on said band and traction devices mounted on said springs and adapted to engage the surface over which the said wheel travels.

2. In combination, a wheel, a rim arranged on said wheel, tires mounted on said rim at each side thereof so as to leave a space between said tires, a band mounted between said tires and provided with side flanges adapted to abut against the sides of the tires, said band being provided with a series of tongues, which said tongues are arranged in pairs with the tongues of each pair of tongues extending toward each other, a series of bow-springs disposed around said plate and having their ends extending in under the tongues on said plate and traction blocks mounted on said springs and adapted to engage the surface over which said wheel travels.

In testimony whereof, I sign the foregoing specification, in the presence of two witnesses.

JAMES BROPSON.

Witnesses:
VICTOR C. LYNCH,
N. L. McDONNELL.